(12) United States Patent
Isaacs

(10) Patent No.: US 7,904,414 B2
(45) Date of Patent: Mar. 8, 2011

(54) ADAPTIVE MULTI-CHANNEL ANSWERING SERVICE FOR KNOWLEDGE MANAGEMENT SYSTEMS

(75) Inventor: Charlie Isaacs, San Jose, CA (US)

(73) Assignee: Kana Software, Inc., Menlo Park, CA (US)

( * ) Notice: Subject to any disclaimer, the term of this patent is extended or adjusted under 35 U.S.C. 154(b) by 603 days.

(21) Appl. No.: 11/695,404

(22) Filed: Apr. 2, 2007

(65) Prior Publication Data

US 2008/0243744 A1    Oct. 2, 2008

(51) Int. Cl.
*G06F 15/00* (2006.01)
*G06F 15/18* (2006.01)

(52) U.S. Cl. .......................................................... 706/62
(58) Field of Classification Search .................. 706/45, 706/46, 62; 705/304, 346
See application file for complete search history.

(56) References Cited

U.S. PATENT DOCUMENTS

| | | | | |
|---|---|---|---|---|
| 6,336,133 | B1* | 1/2002 | Morris et al. | 709/204 |
| 7,519,173 | B2* | 4/2009 | Flores et al. | 379/265.01 |
| 7,587,389 | B2* | 9/2009 | Sugihara et al. | 707/3 |
| 2006/0106796 | A1* | 5/2006 | Venkataraman et al. | 707/6 |
| 2007/0214216 | A1* | 9/2007 | Carrer et al. | 709/204 |
| 2008/0040196 | A1* | 2/2008 | Coon et al. | 705/10 |

OTHER PUBLICATIONS

Apple, Support—Discussion forum, archived website from Apr. 7, 2006, available at: http://web.archive.org/web/20060407084435/discussions.apple.com/forum.jspa?forumID=808, accessed Sep. 9, 2009.*
Increase Customer Self-Service Success with KANA Web Collaboration; Kana Software.
Answering Customers' Questions the Intelligent Way; Kana Software.

* cited by examiner

*Primary Examiner* — Donald Sparks
*Assistant Examiner* — Vincent M Gonzales
(74) *Attorney, Agent, or Firm* — Steven M. Greenberg, Esq.; Carey Rodriguez Greenberg & Paul LLP

(57) ABSTRACT

Embodiments of the present invention address deficiencies of the art in respect to inquiry resolution for KM systems and provide a method, system and computer program product for multi-channel answering services for inquiry resolution in a KM system. In an exemplary embodiment of the invention, a method for multi-channel answering services for inquiry resolution in a KM system can include receiving a request for interaction with an answering server of the KM system, extracting question text from the request along with question text meta-data, and deducing a context for the question text from the question text meta-data. Thereafter, the context can be analyzed to determine a preferred channel of communication, a preferred mode of interaction and a preferred delivery format for interacting with the answering server. Finally, the answer content can be provided for the question text according to the preferred channel of communication, the preferred mode of interaction and the preferred delivery format.

19 Claims, 2 Drawing Sheets

ADAPTIVE MULTI-CHANNEL ANSWERING SERVICE FOR KNOWLEDGE MANAGEMENT SYSTEMS

BACKGROUND OF THE INVENTION

1. Field of the Invention

The present invention relates to the field of customer relationship management and more particularly to automated inquiry resolution for customer relationship management systems.

2. Description of the Related Art

The corporate enterprise faces a difficult challenge when attempting to simultaneously improve the quality of customer service while reducing service costs. More products, growing product complexity and rapid change substantially increase the amount of information required to answer customer questions and troubleshoot problems. Paradoxically, this information overload has produced an information famine in which the growth of information availability increases the difficulty of finding relevant information—particularly in an online, automated computing environment.

For the corporate enterprise to improve self-service adoption rates, increase call center efficiency and improve response accuracy, solutions are required that assist each of agents, customers, partners and suppliers in finding answers to questions more efficiently. As a result, effective solutions to information search and retrieval have become critical to inquiry resolution. One popular approach includes deploying a search engine that allows users to sift through many information sources. Typically, search engines offer any or a combination of a keyword, simple text and natural language query interface.

While the utilization of a search engine for self-service information retrieval for inquiry resolution has become commonly understood, this approach has demonstrated significant limitations. In particular, the search engine is best suited for use by expert users who are familiar with the content and terminology being searched and who know which search words will most quickly yield a correct answer. However, users without domain expertise cannot easily apply the precision and relevance required for efficient retrieval. Most will recall the experience of entering a few keywords into a search engine only to receive a resulting set of hits numbering in the thousands.

To address the limitations of the basic search engine for information retrieval, the corporate enterprise has turned to the knowledge management (KM) system to better manage and share information. The KM system has been defined as an "IT (Information Technology)-based system developed to support and enhance the organizational processes of knowledge creation, storage/retrieval, transfer, and application." The KM system intends to enable users to access to knowledge of facts, sources of information, and solutions of an organization in the course of inquiry resolution.

The modern KM system often takes the form of a document based system utilizing technologies that permit the creation, management and sharing of formatted documents. Advanced forms of the KM system include ontology based systems incorporating terminologies used to summarize a document, and artificial intelligence (AI) technologies utilizing a customized representation scheme to represent a problem domain. Generally, in a modern KM system, for inquiry resolution one or more answering servers process answer client requests for solutions statically with returned content, or actively with the conduct of a transaction.

Notably, in all implementations of the modern KM system, solutions content authors are rigidly policed to provide solutions content through a specific interface using a specific format. Likewise, solutions seeking clients also are compelled to receive a desired solution also through a specific interface in a specific format. Yet, it is not always reasonable to presume uniformity amongst answer clients and solutions content authors and in many cases subject matter expert authors and answer subscribers prefer to interact with a KM system from remote locations utilizing different interfaces and formats.

BRIEF SUMMARY OF THE INVENTION

Embodiments of the present invention address deficiencies of the art in respect to inquiry resolution for KM systems and provide a method, system and computer program product for adaptive multi-channel answering services for inquiry resolution in a KM system. In an exemplary embodiment of the invention, a method for adaptive multi-channel answering services for inquiry resolution in a KM system can include receiving a request for interaction with an answering server of the KM system, extracting question text from the request along with question text meta-data, and deducing a context for the question text from the question text meta-data. Thereafter, the context can be analyzed to determine a preferred channel of communication, a preferred mode of interaction and a preferred delivery format for receiving answer content to the question text. Finally, the answer content can be provided for the question text according to the preferred channel of communication, the preferred mode of interaction and the preferred delivery format.

Notably, the method also can include receiving an additional request for interaction with the answering server, extracting answer content from the request along with answer content meta-data, and deducing a context for the answer content from the answer meta-data. The context again can be analyzed to determine a preferred channel of communication, a preferred mode of interaction and a preferred delivery format for adding the answer content to the answering server. Thereafter, the answer content can be added to the answering server according to the preferred channel of communication, the preferred mode of interaction and the preferred delivery format.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for an adaptive multi-channel answering service for inquiry resolution in a KM system. In accordance with an embodiment of the present invention, a cross-channel, multi-delivery adapter can be provided for a KM system. The adapter can be configured to deduce a context for a request from a KM system user to determine a preferred channel, mode and format of interaction with the KM system. Specifically, for an answering content authoring user in the KM system, the adapter can be configured to deduce a context for a request to add answer content to an answering server in the KM system in order determine a preferred channel, mode and format in which the authoring user is to add answer the content to the answering server. Likewise, for question text posing subscriber to the KM system, the adapter can be configured to deduce a context for question text provided by the subscriber to the answering server to determine a preferred channel, mode and format in which the subscriber is to receive answer content for the question text posed by the subscriber.

Figure 1:
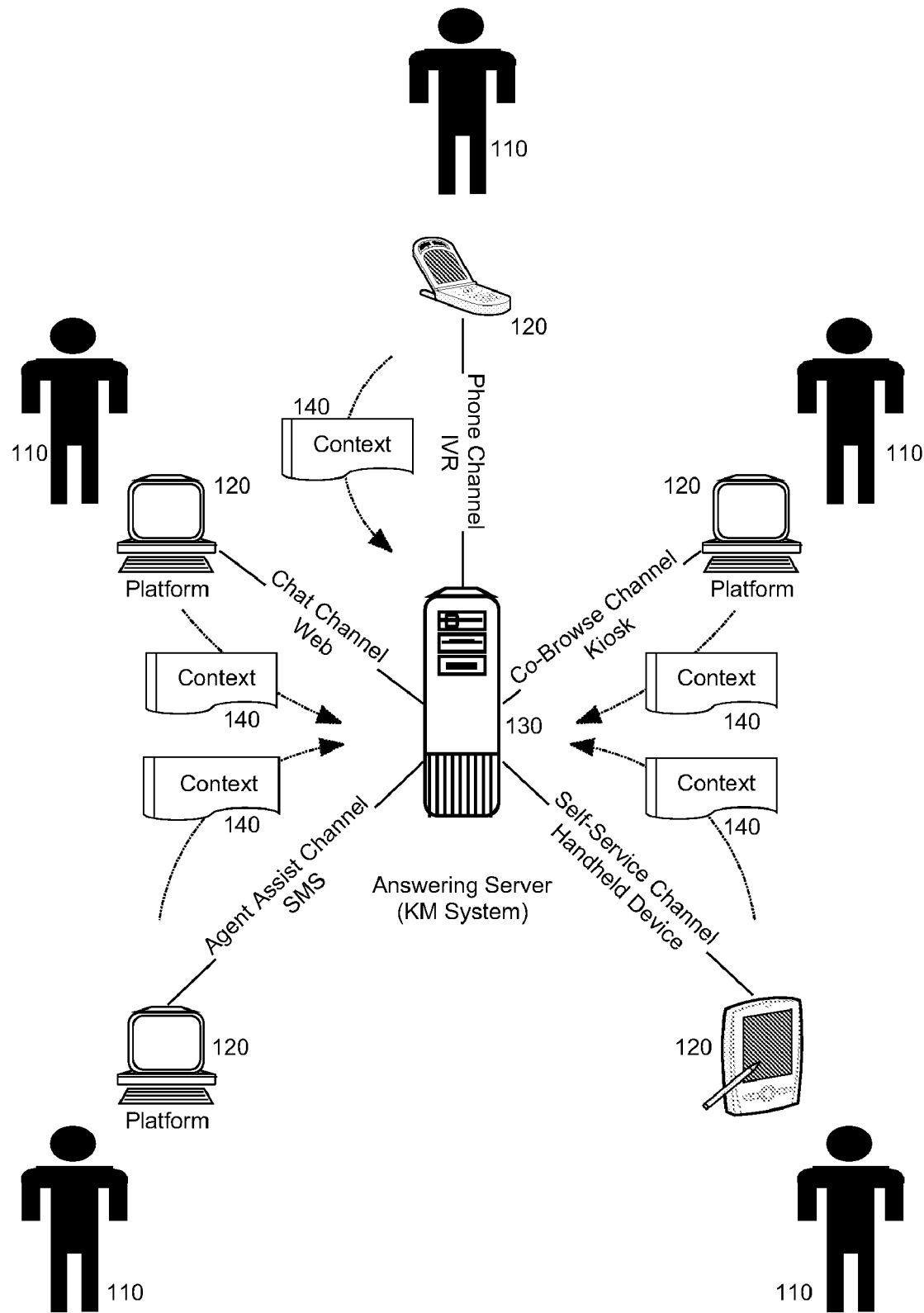
FIG. 1 is a pictorial illustration of a multi-channel answering service for inquiry resolution in a KM system.

In illustration, FIG. 1 pictorial depicts a multi-channel answering service for inquiry resolution in a KM system. The service can include an answering server 130 of a KM system accessed by one or more users 110 over multiple different channels through multiple different modes in which information can be provided in multiple different formats to multiple different computing platforms 120. In this regard, the different channels of communication can include chat, co-browsing, telephonic, e-mail, self-service and agent assisted channels to name a few. Additionally, the different modes of access can include World Wide Web, e-mail, SMS, and MMS, kiosk, handheld device, interactive voice response (IVR), video and audio to name a few modes of access. Finally, the different delivery formats can include a Web page, text to speech, an e-mail, a chat posting and the like.

In operation, as a user 110 requests interaction with the answering server 130 of the KM system. The interaction can include a request to receive answer content for question text from the answering server 130, or a request to add answer content to the answering server 130. The user 110 can provide meta-data for the request from which a context 140 of the request can be deduced. The context 140 in turn can indicate a preferred channel, mode and format for interacting with the user 110. Additionally, the context 140 can indicate a social network of users in a user community associated with the user 110 such that the user community can be included in the interactions between the answering server 130 and the user 110. Once determined, the requested interaction can be managed utilizing the preferred channel, mode and format. As such, the answering server 130 of the KM system can support multiple channels of communication, multiple modes of interaction and multiple formats of delivery.

Figure 2:
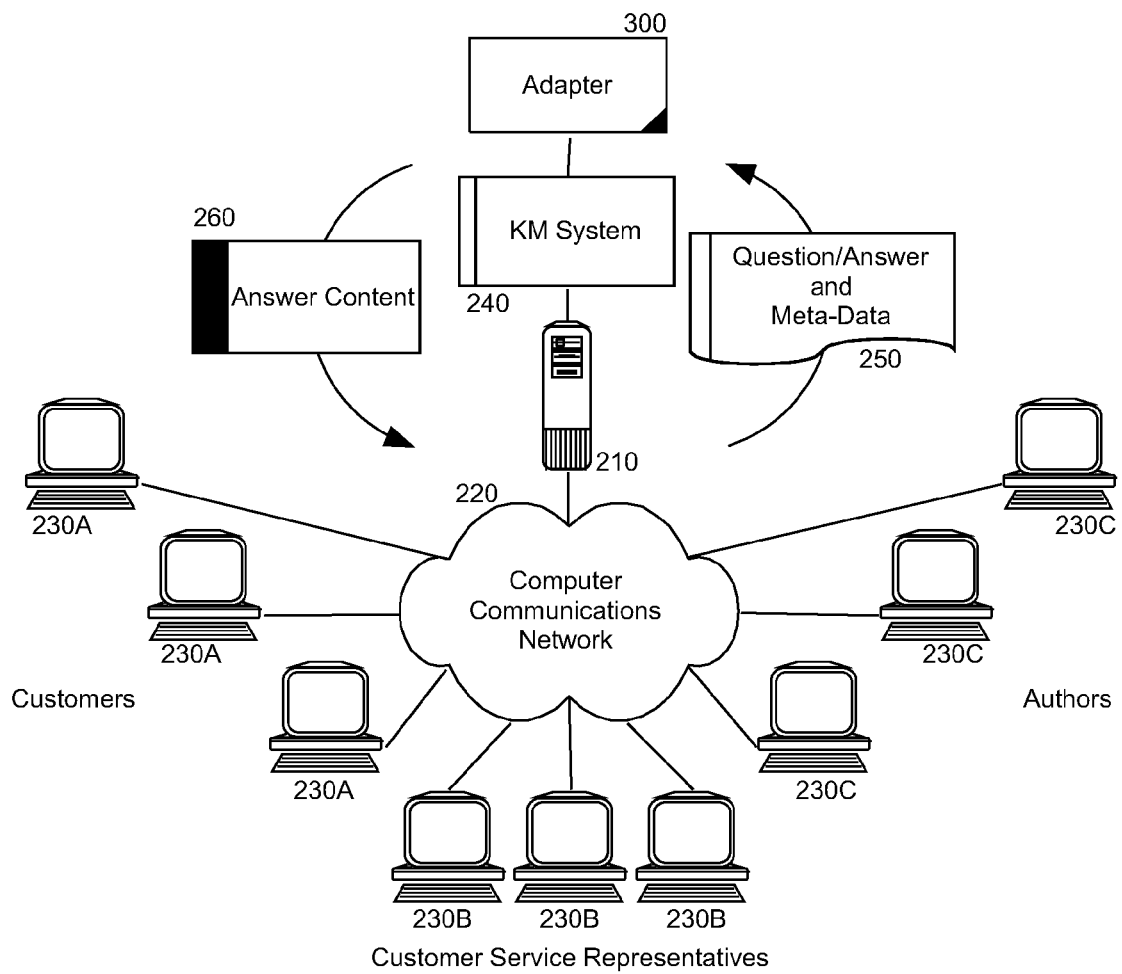
FIG. 2 is a schematic illustration of a KM system configured for multi-channel answering services for inquiry resolution; and, FIG. 3 is a flow chart illustrating a process for multi-channel answering services for inquiry resolution in a KM system.

In more particular illustration, FIG. 2 schematically depicts a KM system configured for multi-channel answering services for inquiry resolution. The system can include an answering server 210 for a KM system 240 communicatively coupled to a plurality of users 230A, 230B, 230C over a computer communications network 220. The users 230A, 230B, 230C can include customers 230A directly accessing a knowledgebase through the answering server 210, customer services representatives 230B accessing the knowledgebase of the answering server 210 on behalf of and for the benefit of the customers 230A, and authors 230C providing content answers for consumption from the answering server 210 by the customers 230A and the customer service representatives 230B.

An adapter 300 can be communicatively linked to the KM system 240. The adapter 300 can include program code enabled to receive a request 250 including either question text or answer content, packaged with meta-data. The request 250 can be received from a requesting one of the users 230A, 230B, 230C indicating a request for interaction with the answering server 210. The program code of the adapter 300 further can be enabled to deduce from the meta-data of the request 250 a context to determine a preferred channel of communications, mode of interaction and delivery format for the requesting one of the users 230A, 230B, 230C when processing the request.

In this regard, the request 250 can include both question text, and optionally static answer text where the request 250 is answer content. In the latter circumstance, the request 250 also can specify a transaction type, transaction details and a workflow identifier to the extent that the answer content invokes an active response such as a transaction. The meta-data of the request 250, by comparison, can indicate an entitlement for the requester, including a user identifier and a group identifier indicating an association of the requestor with a user community. The meta-data of the request 250 also can indicate both a source of the request and a destination for the request in terms of a device identifier and a device location as well as a user identifier. The meta-data of the request 250 yet further can indicate a preferred template identifier defining a look and feel of an interface for interacting with the answering server 110.

In operation, to the extent that the request 250 includes question text, answer content 260 can be returned to the requesting one of the users 230A, 230B, 230C according to the preferred channel of communication, a preferred mode of interaction and a preferred delivery format determined from the context deduced from the meta-data of the request 250. By comparison, to the extent that the request 250 includes answer content, the answer content can be added to the answering server 210 of the KM system 240 according to the preferred channel of communication, the preferred mode of interaction and the preferred delivery format determine from the context deduced from the meta-data of the request 250.

Figure 3:
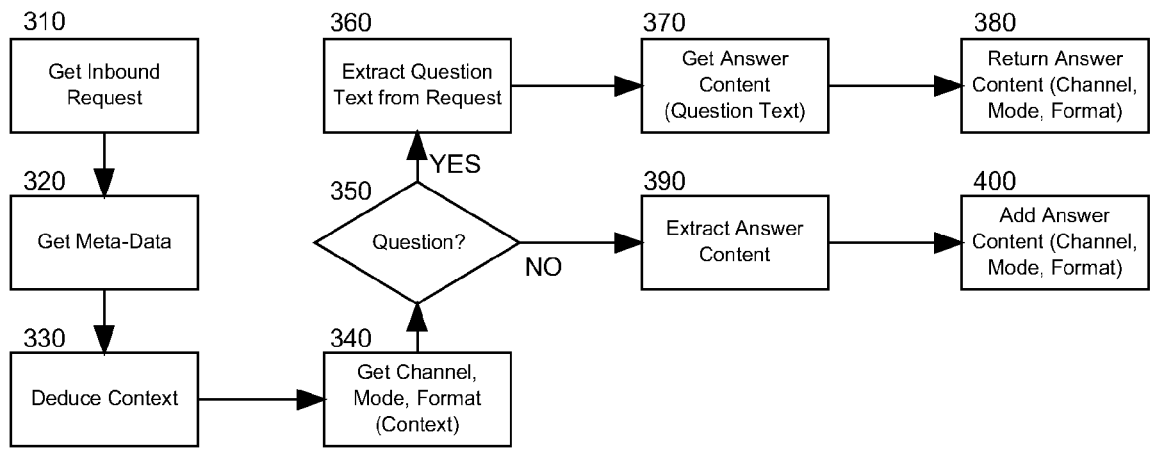

In yet further illustration, FIG. 3 is a flow chart illustrating a process for multi-channel answering services for inquiry resolution in a KM system. Beginning in block 310, an inbound request can be received in the answering server. In block 320, meta-data can be obtained from the request and, in block 330 the context of the request can be deduced from the meta-data including the entitlement of the requester, a source of the request and a destination for a response, and a template for the response. In block 340, the context can be used to determine a preferred channel of communication, preferred mode of interaction and preferred delivery format, for example by correlating the context with the preferred channel, mode and format in a table.

In decision block 350, it can be determined whether the request is a question. If so, in block 360 the question text for the question can be extracted from the request and in block 370, answer content can be retrieved from the answering server for the question text. Thereafter, in block 380 the answer content can be returned to the requestor over the preferred channel of communication utilizing the preferred mode of interaction and in the preferred delivery format. Optionally, the answer content concurrently can be routed to other users associated with the requestor according to the contextually specified user community. Similarly, in decision block 350 if it is determined that the request is an attempt to add answer content to the answering server, in block 390 the answer content can be extracted from the request and in block 400, the answer content can be added to the answering server over the preferred channel of communication utilizing the preferred mode of interaction and in the preferred delivery format.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for multi-channel answering services for inquiry resolution in a knowledge management (KM) system, the method comprising:
    receiving a request for interaction with an answering server of the KM system;
    extracting question text from the request along with question text meta-data;
    deducing a context for the question text from the question text meta-data;
    determining from the context a preferred channel of communication, a preferred mode of interaction and a preferred delivery format for interacting with the answering server; and,
    providing answer content for the question text according to the preferred channel of communication, the preferred mode of interaction and the preferred delivery format.

2. The method of claim 1, further comprising:
    receiving an additional request for interaction with the answering server;
    extracting answer content from the request along with answer content meta-data;
    deducing a context for the answer content from the answer meta-data;
    determining from the context a preferred channel of communication, a preferred mode of interaction and a preferred delivery format for interacting with the answering server; and,
    adding the answer content to the answering server according to the preferred channel of communication, the preferred mode of interaction and the preferred delivery format.

3. The method of claim 2, wherein extracting answer content from the request along with answer content meta-data, comprises extracting a multi-part question and answer from the request along with a workflow identifier indicating to which workflow process the multi-part question and answer is to be associated.

4. The method of claim 1, further comprising:
    identifying a user community from the context; and,
    providing the answer content to the users in the user community.

5. The method of claim 1, further comprising:
    identifying a user entitlement from the context; and,
    limiting the providing of the answer content to the question text in accordance with the user entitlement.

6. A knowledge management (KM) data processing system comprising:
    an answering server configured for communicative coupling to a plurality of question text posting users and answer content authoring users; and,
    an multi-channel answering service adapter comprising program code enabled to parse question text packaged with question text meta-data to deduce a context for the question text from the question text meta-data, to determine from the context a preferred channel of communication, a preferred mode of interaction and a preferred delivery format for providing answer content to the question text, and to provide the answer content to the question text according to the preferred channel of communication, the preferred mode of interaction and the preferred delivery format.

7. The system of claim 6, wherein the program code is further enabled to parse answer content packaged with answer content meta-data to deduce a context for the answer content from the answer content meta-data, to determine from the context a preferred channel of communication, a preferred mode of interaction and a preferred delivery format for adding the answer content to the answering server, and to add the answer content to the answering server according to the preferred channel of communication, the preferred mode of interaction and the preferred delivery format.

8. The system of claim 7, wherein the preferred channel of communication comprises a set of channels comprising each of chat, co-browsing, telephony, e-mail, self-service and agent assist.

9. The system of claim 7, wherein the preferred mode of interaction comprises a set of modes comprising each of Web, e-mail, short messaging service (SMS), multimedia messaging service (MMS), kiosk, handheld device, interactive voice response (IVR), video and audio.

10. The system of claim 7, wherein the preferred delivery format comprises a set of formats comprising each of a Web page, text-to-speech, chat and e-mail.

11. The system of claim 6, wherein the preferred channel of communication comprises a set of channels comprising each of chat, co-browsing, telephony, e-mail, self-service and agent assist.

12. The system of claim 6, wherein the preferred mode of interaction comprises a set of modes comprising each of Web, e-mail, short messaging service (SMS), multimedia messaging service (MMS), kiosk, handheld device, interactive voice response (IVR), video and audio.

13. The system of claim 6, wherein the preferred delivery format comprises a set of formats comprising each of a Web page, text-to-speech, chat and e-mail.

14. The system of claim 6, wherein the question text meta-data comprises each of an entitlement for a requesting user, a source of the question text, a template for presenting the answer content to the requesting user, and a destination for sending the answer content to the requesting user.

15. A computer program product comprising a computer usable medium embodying computer usable program code for multi-channel answering services for inquiry resolution in a knowledge management (KM) system, the computer program product comprising:
   computer usable program code for receiving a request for interaction with an answering server of the KM system;
   computer usable program code for extracting question text from the request along with question text meta-data;
   computer usable program code for deducing a context for the question text from the question text meta-data;
   computer usable program code for determining from the context a preferred channel of communication, a preferred mode of interaction and a preferred delivery format for interacting with the answering server; and,
   computer usable program code for providing answer content for the question text according to the preferred channel of communication, the preferred mode of interaction and the preferred delivery format.

16. The computer program product of claim 15, further comprising:
   computer usable program code for receiving an additional request for interaction with the answering server;
   computer usable program code for extracting answer content from the request along with answer text meta-data;
   computer usable program code for deducing a context for the answer content from the answer content meta-data;
   computer usable program code for determining from the context a preferred channel of communication, a preferred mode of interaction and a preferred delivery format for interacting with the answering server; and,
   computer usable program code for adding the answer content to the answering server according to the preferred channel of communication, the preferred mode of interaction and the preferred delivery format.

17. The computer program product of claim 16, wherein extracting answer content from the request along with answer content meta-data, comprises extracting a multi-part question and answer from the request along with a workflow identifier from the answer content meta-data for indicating to which workflow process the multi-part question and answer is to be associated.

18. The computer program product of claim 15, further comprising:
   computer usable program code for identifying a user community from the context; and,
   computer usable program code for providing the answer content to the users in the user community.

19. The computer program product of claim 15, further comprising:
   computer usable program code for identifying a user entitlement from the context; and,
   computer usable program code for limiting the providing of the answer content in accordance with the user entitlement.

* * * * *